United States Patent [19]

Wooden et al.

[11] Patent Number: 5,271,759
[45] Date of Patent: Dec. 21, 1993

[54] PIGMENT COMPOSITIONS

[75] Inventors: Gary Wooden, Oberschrot; Olof Wallquist, Marly, both of Switzerland

[73] Assignee: Ciba-Geigy Corporation, Ardsley, N.Y.

[21] Appl. No.: 877,680

[22] Filed: May 1, 1992

[30] Foreign Application Priority Data

May 7, 1991 [CH] Switzerland ............ 1362/91

[51] Int. Cl.$^5$ ............................. C09B 67/10
[52] U.S. Cl. ......................... 106/411; 106/410; 106/413; 106/493; 106/494; 106/495; 106/496; 106/497; 106/499
[58] Field of Search ............ 106/493, 494, 495, 496, 106/497, 499, 410, 411, 413

[56] References Cited

U.S. PATENT DOCUMENTS

| 4,049,615 | 9/1977 | Elsener et al. | 523/208 |
|---|---|---|---|
| 4,107,133 | 8/1978 | Sawai et al. | 524/88 |
| 4,116,897 | 9/1978 | Huszár et al. | 524/528 |
| 4,233,206 | 11/1980 | Katsura et al. | 524/88 |
| 4,559,057 | 12/1985 | Bogaty et al. | 8/405 |
| 4,764,217 | 8/1988 | von der Crone et al. | 106/494 |
| 4,844,742 | 7/1989 | Jaffe | 106/497 |
| 5,128,454 | 7/1992 | Frölich | 534/575 |

FOREIGN PATENT DOCUMENTS

0132960 2/1985 European Pat. Off. .
0278913 8/1988 European Pat. Off. .
1356006 6/1974 United Kingdom .

OTHER PUBLICATIONS

Manufacturing Chemist, Jul. 1987, p. 24 "Cationic Polymers For Skin & Hair Conditioning", Philip Alexander.
Chemical Abstract 98:127131x, Sep. 1982, of JP 57-155, 242, "Coloring Agents For Polyolefins", Dainippon Ink & Chemicals, Inc.
Chemical Abstract 99:89115f, Feb. 1983, of JP 58-23,840, "Coloring Agents For Polyolefins", Dainichiseika Color and Chemicals Mfg.
Chemical Abstract 97:164038x, May 1982, of JP 82-73,029, "Coloring Agents For Resins", Toya Soda Mfg. Co., Ltd.
Japanese Kokai 57:051733 (C.A. 97:73414), Mar. 1982, "Polyolefin Moldings Containing Yellow Pigments", Toya Soda Mfg.
Japanese Kokai 57:159831 (C.A. 98:127145), Oct. 1982, "Colored Polyolefin Molding Compositions", Dainippon Ink and Chem.
Japanese Kokai 53:132048 (CA 90:122564), Nov. 1978, "Color Compositions for Polyolefins", Tokyo Printing Ink Mfg. Co., Ltd.
Japanese Kokai 53:143646 (CA 91:40351), Dec. 1978, "Coloring of Polyolefins", Tokyo Printing Ink Mfg. Co., Ltd.
Japanese Kokai 53:124555 (CA 90:104966), Nov. 1978, "Coloring Compositions for Polyolefin Molding Composition", Teijin Ltd.
W.P.I. Acc. No. 88-229726/33 of EP 278,913 Aug. 1988.

*Primary Examiner*—Karl Group
*Assistant Examiner*—Scott L. Hertzog
*Attorney, Agent, or Firm*—JoAnn Villamizar; George R. Dohmann

[57] ABSTRACT

Pigment compositions comprising
a) at least one organic pigment,
b) 0.05 to 10% by weight, based on the organic pigment a), of at least one modified organic pigment of formula $$A{\text{-}}(SO_3X)_m \qquad (I)$$

wherein A is the radical of an organic pigment, X is H, Na or K and m is an integer from 0.05 to 3, and
c) 0.05 to 10% by weight, based on the organic pigment a), of at least one polymeric ammonium salt having an average molecular weight from 500 to 2 500 000 and which is soluble in water or a lower alkanol.

These pigment compositions have excellent suitability for the wrap-free pigmenting of polyolefins and, when incorporated in paint systems and printing inks, exhibit excellent rheology.

14 Claims, No Drawings

PIGMENT COMPOSITIONS

The present invention relates to novel pigment compositions comprising at least one organic pigment, one organic pigment modified by sulfonic acid or alkali metal sulfonate groups and one polymeric ammonium salt, and to the use thereof for colouring high molecular weight organic material and, in particular, for the warp-free pigmenting of polyolefins.

When colouring polyolefins, especially polyethylene, with organic pigments it is frequently observed that, in time, a number of mechanical properties of the coloured material undergo change. Failure symptoms which may be broadly categorised as warping occur. In bulky moulded articles, such as bottle crates made of high density polyethylene, deformation and shrinkage is observed, sometimes resulting in cracking and usually making the articles unfit for use. Even after quite brief use, embrittlement of the material occurs. These defects are attributable to the majority of the organic pigments, whereas the inorganic pigments and a minority of the organic pigments are neutral in their effect. The presumption is that these defects arise because the presence of the pigments interferes with the typical crystallisation behaviour of the polyolefins, as the pigments may act as centres of nucleation.

Various methods which would make it possible to avoid these drawbacks have already been proposed. Usually, however, these methods relate to specific pigment classes. According to the teaching of U.S. Pat. No. 4,233,206, the warp-free colouration of polyolefins can be achieved by using organic pigments which contain methylol groups esterified with carboxylic acids (especially copper phthalocyanines); according to JP Kokai 53-124555, U.S. Pat. No. 4,107,133 and JP Kokai 53-143646 by using an isoindolinone or copper phthalocyanine pigment treated with a silane coupler; according to JP Kokai 53-132048 by using an isoindolinone pigment with the addition of a salicyloyl hydrazide; according to JP Kokai 57-73029 by using a pigment of the quinacridone, isoindolinone, azo or phthalocyanine series which adsorbs on inorganic material (e.g. silica gel) and is subsequently treated with a silane or titanium coupler; according to JP Kokai 57-159831 by using an isoindolinone pigment treated with a phenylenebistetrachlorobenzamide; according to JP Kokai 58-23840 by using a phthalocyanine pigment with the addition of an amine-treated halomethyl copper phthalocyanine.

An enhancement of the warp properties of isoindolinone pigments can also be achieved according to JP Kokai 57-51733 and 57-155242 by a recrystallisation of the pigment. Those skilled in the pigment art know, however, that the increase in the particle size thereby obtained is associated with losses in other important pigment properties, especially colour strength.

A process for the warp-free colouration of polyolefins by using an organic pigment coated with a melamine-formaldehyde resin, preferably a perylene, perinone, bisazo or isoisoindolinone pigment, is disclosed in U.S. Pat. No. 4,049,615.

These methods do not satisfy all the exacting requirements of current technology and, depending on the pigment, do not lead to the desired result. Thus, for example, there is still no method known which would permit diketopyrrolopyrrole pigments to be used for the warp-free pigmenting of polyolefins.

Surprisingly, it has now been found that pigment compositions comprising at least one organic pigment, one organic pigment modified by sulfonic acid or alkali metal sulfonate groups and one polymeric ammonium salt, are very suitable for the warp-free pigmenting of polyolefins. In addition, these pigment compositions, when incorporated in paint systems or printing inks, exhibit excellent rheology and also have very good dispersibility, colour strength, flocculation resistance and superior gloss.

Accordingly, the invention relates to pigment compositions comprising
a) at least one organic pigment,
b) 0.05 to 10% by weight, based on the organic pigment a), of at least one modified organic pigment of formula

wherein A is the radical of an organic pigment, X is H, Na or K and m is an integer from 0.05 to 3, and
c) 0.05 to 10% by weight, based on the organic pigment a), of at least one polymeric ammonium salt having an average molecular weight from 500 to 2 500 000 and which is soluble in water or a lower alkanol.

Suitable organic pigments a) are typically those of the azo, diketopyrrolopyrrole, perylene, quinacridone, phthalocyanine, perinone, quinophthalone, isoindolinone, isoindoline, benzimidazolone, dioxazine, anthraquinone, thioindigo, methine, azomethine or metal complex series.

Particularly interesting pigments, however, are those of the azo, diketopyrrolopyrrole, perylene, quinacridone, phthalocyanine, isoindoline or isoindolinone series, preferably the phthalocyanines and, more particularly, the diketopyrrolopyrroles, most preferably 1,4-diketo-3,6-di-(4-chlorophenyl)pyrrolo[3,4-c]pyrrole.

The radical A of an organic pigment will be understood as meaning conveniently the radical of a pigment of the azo, diketopyrrolopyrrole, perylene, quinacridone, phthalocyanine, isoindoline, isoindolinone or mertal complex series, preferably the phthalocyanines and, more particularly, the diketopyrrolopyrroles.

Modified pigments of formula I and also mixtures thereof with pigments (a+b) are disclosed in U.S. Pat. Nos. 4,914,211, 4,992,495, 4,980,458, 4,865,650, 4,764,217, in EP-A 278 913 and in DE-A 4 037 556. Any that are not novel can be prepared by methods similar to known ones.

Suitable polymeric ammonium salts c) may typically be the following:
homopolymers or copolymers of 2-[tri($C_1$–$C_2$alkyl)ammonium]ethyl acrylates or methacrylates;
cationic cellulose or starch aminoethers;
cationic homopolymers or copolymers of vinyl pyridine;
cationic polyethylenepolyamines;
cationic amine-formaldehyde condensates;
homopolymers or copolymers of di($C_1$–$C_2$alkyl)diallylammonium salts;
cationic modified polypeptides;
cationic polyamides;
homopolymers or copolymers of quaternised epichlorohydrin.
Preferred polymeric ammonium salts c) are:

homopolymers or copolymers of 2-[tri($C_1$-$C_2$alkyl)ammonium]ethyl acrylates or methacrylates;
cationic polyethylenepolyamines;
cationic amine-formaldehyde condensates;
homopolymers or copolymers of di($C_1$-$C_2$alkyl)diallylammonium salts;
cationic polyamides;
homopolymers or copolymers of quaternised epichlorohydrin.

Such polymeric ammonium salts are known and commercially available. They are mainly used in cosmetics. Products of this kind suitable for the novel pigment composition are described e.g. in Cationic Polymers for Skin & Hair Conditioning, Manufacturing Chemist, July 1987, pp. 24–29, and in EP-A 132 960.

The term "lower alkanol" will be understood as meaning typically a $C_1$-$C_3$alkanol, such as methanol, n-propanol, isopropanol and, preferably, ethanol.

Preferred compositions comprise
a) at least one organic pigment,
b) 0.1 to 7% by weight, based on the pigment a), of at least one modified organic pigment of formula I, wherein m is an integer from 0.1 to 2.5, and
c) 0.1 to 7%, based on the pigment a), of a polymeric ammonium salt having an average molecular weight of 1000 to 1 500 000.

Especially preferred pigment compositions comprise
a) an organic pigment,
b) 0.1 to 5% by weight, based on the pigment a), of at least one modified organic pigment of formula I, wherein X is H or Na and m is an integer from 0.5 to 2, and
c) 0.1 to 5% by weight, based on the pigment a), of a polymeric ammonium salt having an average molecular weight of 5000 to 1 000 000 and which is soluble in water.

A is preferably a radical of the same pigment which is present in the composition as component a). Preferably A is the radical of a pigment of the diketopyrrolopyrrole series.

To prepare the novel composition, component a) is suspended preferably as moist press cake in water or a lower alkanol and afterwards mixed with component b), which is likewise suspended in water or a lower alkanol. To this slurry is then added a solution of the polymeric ammonium salt in water or a lower alkanol. The suspension is stirred at a temperature of preferably 10° to 100° C., more particularly 20° to 85° C., filtered, and the residue is washed with water and dried. The stirring time usually varies from 30 minutes to 20 hours. If necessary, the suspension can be dispersed with a dispersing aggregate (typically a high-pressure homogeniser or an impeller).

The addition of components b) and c) is made, as previously mentioned, preferably after the conditioning of component a). By conditioning is meant the preparation of a finely particulate form, typically by alkaline precipitation, dry milling with or without salt, solvent or aqueous milling or salt kneading.

Depending on the conditioning method or the envisaged application it can be advantageous, before or after conditioning, to add to the pigment besides the novel addition of components b) and c), specific amounts of texture improvers, provided this addition does not have an adverse affect on the use of the novel pigment compositions (especially in polyethylene). Particularly suitable texture improvers are fatty acids of at least 18 carbon atoms, typically stearic acid or behenic acid or their amides or metal salts, preferably magnesium salts, as well as plasticisers, waxes, resin acids such as abietic acid, rosin soap, alkyl phenols or aliphatic alcohols such as stearyl alcohol, or aliphatic 1,2-dihydroxy compounds of 8 to 22 carbon atoms, typically 1,2-dodecanediol, and also modified rosin maleate resins or fumaric acid rosin resins. The texture improvers are preferably added in amounts of 0.1 to 30% by weight, preferably 2–15% by weight, based on the final product. The cited 1,2-dihydroxy compounds, preferably 1,2-dodecanediol, also help to facilitate the filtration of the suspended pigment composition.

As already mentioned, the novel pigment compositions are distinguished by their surprisingly good suitability for the warp-free pigmenting of polyolefins.

Accordingly, the invention also relates to a process for the warp-free pigmenting of polyolefins, which comprises the use of a pigment composition as defined above.

The novel process for the warp-free pigmenting of polyolefins with the pigment compositions of this invention is carried out by standard methods with the customary amounts of typically 0.01 to 5% by weight of pigment composition, based on the polyolefin.

The great, and surprising, advantage of the novel process is that polyolefins, especially polyethylene, can be coloured with organic pigments which have extreme fastness properties and which have heretofore been unsuitable, or at least of limited suitability, for this purpose.

The test for non-warping of polyolefins by a pigment is carried out using an injection moulded article in the form of a plate. After ageing for 72 hours at 100° C., the dimensions of the plate (length and width) are measured and the warp $\Delta L$ (length) and $\Delta B$ (width) in °/oo are determined by the following equations:

$$\Delta L = \frac{L \text{colourless specimen} - L \text{pigmented specimen}}{L \text{colourless specimen}} \times 1000$$

$$\Delta B = \frac{B \text{colourless specimen} - B \text{pigmented specimen}}{B \text{colourless specimen}} \times 1000$$

Pigments which are warp-free in practice are those in which the absolute values of $\Delta L$ and $\Delta B$ are smaller than 5. Values smaller than 3 are especially preferred.

The novel pigment compositions also have excellent suitability for pigmenting aqueous and/or solvent-based paint systems as well as printing inks in which they exhibit excellent rheology. The colorations obtained with the novel pigment compositions have good all-round properties, including dispersibility, high colour strength and gloss, and good fastness to migration, heat, light and weathering.

The following Examples will serve to illustrate the invention.

EXAMPLE 1 a) A mixture of 35 g of polyethylene glycol monomethyl ether 350 ® (Fluka), 27.2 g of trimethylsilyl chloride and 17.4 g of lithium bromide in 200 ml of anhydrous acetonitrile is refluxed for 24 hours. The solvent and excess trimethylsilyl chloride are removed by distillation and the residue is dried overnight in a vacuum oven at 80° C. The product obtained corresponds to $CH_3O-[CH_2CH_2O]_n-CH_2CH_2Br$ by NMR analysis.

b) 8.6 g of polyethyleneimine (Jansen Chimica; average MW 50 000-60 000), 50% in water, are then reacted with the product obtained in a) by refluxing for 24 hours in 500 ml of water. The water is thereafter removed by evaporation and the residue is dried in a vacuum oven for 20 hours at 80° C., giving 59 g of a yellowish oily polymer.

EXAMPLE 2

The procedure of Example 1 is repeated, but using 75 g of polyethylene glycol monomethyl ether 750 ® (Fluka) instead of 35 g of the polyethylene glycol derivative, to give 95 g of a yellowish oily polymer.

EXAMPLES 3-11

A mixture of a moist press cake of 1,4-diketo-3,6-di-(4-chlorophenyl)pyrrolo[3,4-c]pyrrole (25.0 g dry weight) and 0.5 g of the sodium salt of a sulfonated mixture of diketopyrrolopyrroles of formulae

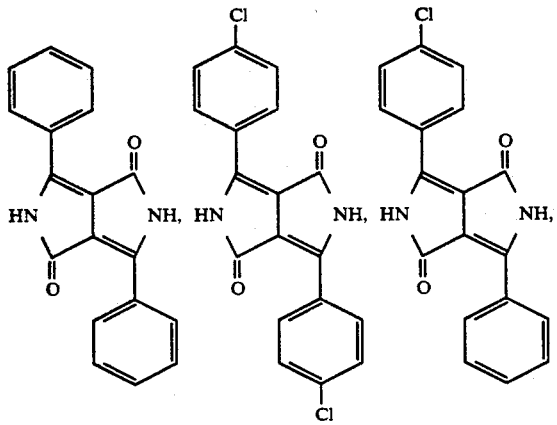

obtained according to Example 1 a+b) of DE-OS 4 037 556, are slurried together in 450 ml of deionised water. The pH of the slurry is adjusted to 7 (with dilute NaOH or HCl), and then 0.5 g (dry weight) of each of the polymeric ammonium salts listed in the following Table, dissolved in 50 ml of deionised water or ethanol, is added. The mixture is stirred for 90 minutes at 75° C., then cooled to 40° C., and filtered. The pigment so obtained is washed with water and dried in a vacuum oven at 100° C.

| Example | Polymeric ammonium salt |
|---|---|
| 3 | cationic modified polypeptide ® Croquat M (Croda Chemicals Ltd) |
| 4 | polymeric ammonium salt ® Polyfix 601 (Showa High Polymer Co.) |
| 5 | dimethyldiallylammonium chloride homopolymer ® Merquat 100 (Chemviron Specialty Chemicals) |
| 6 | cationic polyglycol polyamine condensate ® Polyquat H81 (Henkel) |
| 7 | poly(N,N-dimethyl-3,5-dimethylenepiperidinium chloride) (Janssen Chimica) |
| 8 | cationic polyamide ® Mirapol AD-1 (Miranol Inc.) |
| 9 | quaternary polyhydroxyalkylenepolyamine ® Cartafix F (Sandoz AG) |
| 10 | polymer of Example 1 |
| 11 | polymer of Example 2 |

EXAMPLE 12

A mixture of a moist press cake of 1,4-diketo-3,6-di-(4-methylphenyl)pyrrolo[3,4-c]pyrrole (7.0 g dry weight) and a moist press cake of the diketopyrrolopyrrole of formula

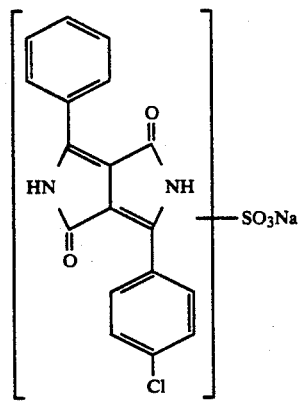

obtained according to Example 17 of U.S. Pat. No. 4,914,211 (0.07 g dry weight) is slurried in 230 ml of deionised water. The pH of the slurry is adjusted to 7, and then 0.35 g of the cationic amine-formaldehyde condensate ®Tinofix EW (CIBA-GEIGY AG), dissolved in 50 ml of deionised water, is added. The slurry is stirred for 1 hour at 75° C., then cooled to 40° C. and filtered. The resultant pigment is washed with water and dried in a vacuum oven at 100° C., giving 7.4 g of a red powder.

EXAMPLE 13

The procedure described in Example 12 is repeated, but replacing ®Tinofix EW with the same amount of the polymeric ammonium salt of Example 1, to give 7.2 g of a red powder with the same properties.

EXAMPLE 14

A mixture of a moist press cake of copper phthalocyanine (14.6 g dry weight) and a moist press cake of a pigment of formula

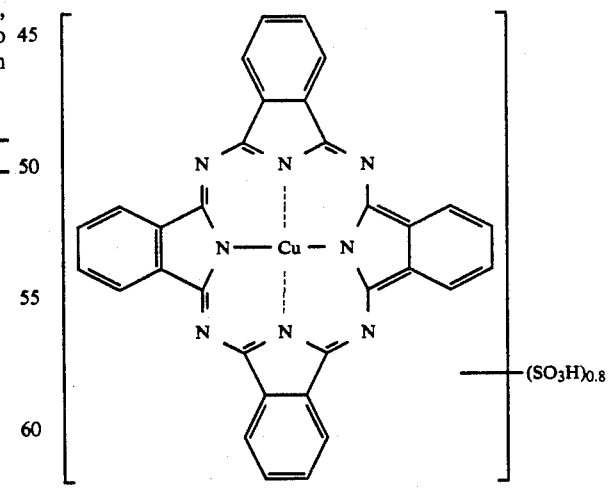

(0.3 g dry weight) is slurried in 180 ml of deionised water. The pH of the slurry is adjusted to 7-8 with 30% aqueous sodium hydroxide and the slurry is heated to 60° C. Then 0.6 g of the cationic amine-formaldehyde condensate ®Tinofix EW (CIBA-GEIGY AG), dissolved in 30 ml of deionised water, is added. The suspension is stirred for 1½ hours at 75° C., then cooled to room temperature and filtered. The residue is washed with water and dried in a vacuum oven at 80° C., giving 14.8 g of a blue powder.

EXAMPLE 15

2 g of the pigment composition obtained according to Example 14 are dry blended with 1 kg of polyethylene ®Stamilan 9089 V in an eccentric tumbler mixer for 10 minutes. The mixture is then extruded in a single screw extruder twice at 240° C. The granulate so obtained is processed on an injection moulding machine at 240° C. to plates measuring 174×49×2.5 mm. The pigmented plate and a plate prepared under identical conditions, but with the same amount of uncoated pigment, are aged for 72 hours at 100° C. and the dimensions of the plates are then measured. Warping is determined by the above described method.

Compared to the plate coloured with the untreated pigment, the plate prepared by the process of the invention has greatly reduced $\Delta L$ and $\Delta B$ values.

The polyethylene plates coloured with the pigment compositions of Examples 3 to 11 by the same method show comparably good results. In all cases, but especially the plates coloured with the pigment compositions of Examples 5 to 9, the $\Delta L$ and $\Delta B$ values are greatly reduced in comparison to those of the plate coloured with untreated pigment.

EXAMPLE 16

The pigment composition of Example 3 is incorporated in an amount of 14% by weight into an alkyd/melamine varnish system in conventional manner. The flow properties of the varnish are determined by means of a Brookfield viscosimeter at different spindle speeds (1.5, 6, 30 and 60 rpm). The viscosity of the varnish is markedly lower than that of one containing the same concentration of untreated 1,4-diketo-3,6-bis(4-chlorophenyl)pyrrolo[3,4-c]pyrrole and having otherwise the same composition.

The finishes obtained with these varnishes also exhibit a higher gloss and a higher colour strength of the products which contain the novel pigment compositions.

Comparably good results are obtained by using instead of the pigment composition of Example 3 pigment compositions of each of Examples 4 to 11.

EXAMPLE 17

The pigment composition of Example 12 is incorporated in an amount of 9% by weight into an alkyd/melamine varnish system in conventional manner. The flow properties of the varnish are determined by means of a ®Rotovisco RV12 viscosimeter (HAAKE) (measuring temperature: 25° C., measuring system: SV-SO, shear range: D=0-100 [1/s]. The varnish has a markedly lower viscosity than one containing the same concentration of untreated 1,4-diketo-3,6-di-(4-methylphenyl)pyrrolo[3,4-c]pyrrole and otherwise having the same composition.

A comparably good result is achieved by using the pigment composition of Example 12 instead of that of Example 13.

What is claimed is:
1. A pigment composition comprising
a) at least one non-sulfonated organic pigment,
b) 0.05 to 10% by weight, based on the organic pigment a), of at least one modified organic pigment of formula

wherein A is the radical of an organic pigment, X is H, Na or K and m is from 0.05 to 3, and
c) 0.05 to 10% by weight, based on the organic pigment a), of at least one polymeric ammonium salt having an average molecular weight from 500 to 2,500,000 and which is soluble in water or a lower alkanol.

2. A pigment composition according to claim 1, wherein component a) is at least one pigment of the azo, diketopyrrolopyrrole, perylene, quinacridone, phthalocyanine, perinone, quinophthalone, isoindolinone, isoindoline, benzimidazolone, dioxazine, anthraquinone, thioindigo, methine, azomethine or metal complex series.

3. A pigment composition according to claim 1, wherein component a) is at least one pigment of the azo, diketopyrrolopyrrole, perylene, quinacridone, phthalocyanine, isoindoline or isoindolinone series.

4. A pigment composition according to claim 1, wherein component a) is a phthalocyanine or diketopyrrolopyrrole pigment.

5. A pigment composition according to claim 1, wherein A in formula 1 is the radical of a pigment of the azo, diketopyrrolopyrrole, perylene, quinacridone, phthalocyanine, isoindoline, isoindolinone or metal complex series.

6. A pigment composition according to claim 1, wherein A in formula 1 is the radical of a phthalocyanine or diketopyrrolopyrrole pigment.

7. A pigment composition according to claim 1, wherein component c) is a polymeric ammonium salt selected from the group consisting of:
homopolymers or copolymers of 2-[tri($C_1$-$C_2$alkyl)ammonium]ethyl acrylates or methacrylates;
cationic cellulose or starch aminoethers;
cationic homopolymers or copolymers of vinyl pyridine;
cationic polyethylenepolyamines;
cationic amine-formaldehyde condensates;
homopolymers or copolymers of di($C_1$-$C_2$alkyl)diallylammonium salts;
cationic modified polypeptides;
cationic polyamides;
homopolymers or copolymers of quaternised epichlorohydrin.

8. A pigment composition according to claim 1, wherein component c) is a polymeric ammonium salt selected from the group consisting of:
homopolymers or copolymers of 2-[tri($C_1$-$C_2$alkyl)ammonium]ethyl acrylates or methacrylates;
cationic polyethylenepolyamines;
cationic amine-formaldehyde condensates;
homopolymers or copolymers of di($C_1$-$C_2$alkyl)diallylammonium salts;
cationic polyamides;
homopolymers or copolymers of quaternised epichlorohydrin.

9. A pigment composition according to claim 1, comprising
a) at least one organic pigment, b) 0.1 to 7% by weight, based on the pigment a), of at least one modified organic pigment of formula I, wherein m is from 0.1 to 2.5, and c) 0.1 to 7%, based on the pigment a), of a polymeric ammonium salt having an average molecular weight of 1000 to 1,500,000.

10. A pigment composition according to claim 1, comprising a) an organic pigment, b) 0.1 to 5% by weight, based on the pigment a), of at least one modified organic pigment of formula I, wherein X is H or Na and m is from 0.5 to 2, and c) 0.1 to 5% by weight, based on the pigment a), of a polymeric ammonium salt having an average molecular weight of 5000 to 1,000,000 and which is soluble in water.

11. A pigment composition according to claim 1, wherein A in formula I is a radical of the same pigment present in the composition as component a).

12. A pigment composition according to claim 1, wherein component a) is a diketopyrrolopyrrole and A in formula I is the radical of a diketopyrrolopyrrole pigment.

13. A process for the warp-free pigmenting of polyolefins, which comprises the use of a pigment composition as claimed in claim 1.

14. A process for pigmenting aqueous and solvent-based paint systems and printing inks which comprises the use of a pigment composition as claimed in claim 1.

* * * * *